UNITED STATES PATENT OFFICE.

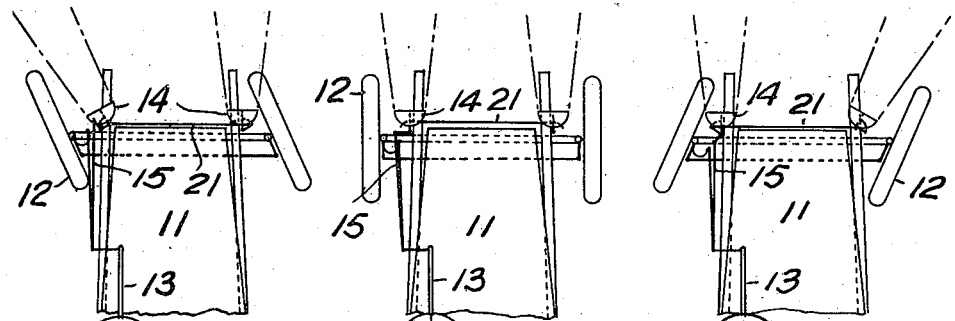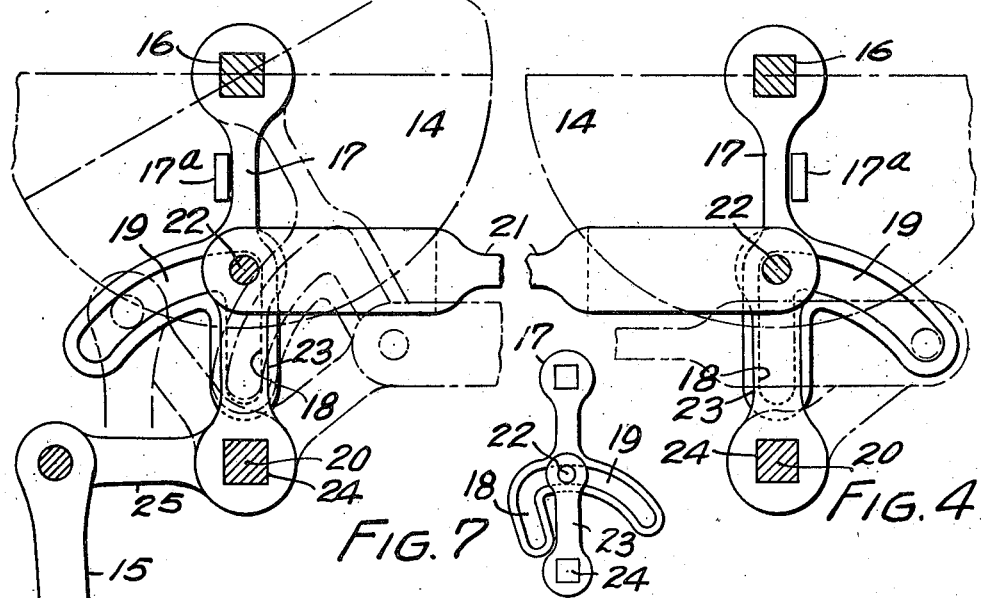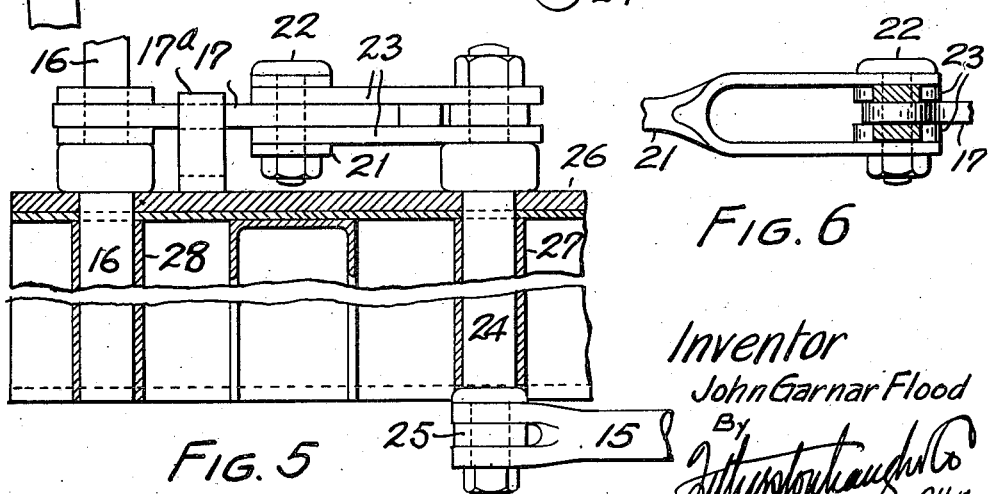

JOHN GARNAR FLOOD, OF QUEBEC, QUEBEC, CANADA.

DIRIGIBLE-HEADLIGHT MECHANISM.

1,425,759. Specification of Letters Patent. Patented Aug. 15, 1922.

Application filed April 23, 1921. Serial No. 464,015.

*To all whom it may concern:*

Be it known that I, JOHN GARNAR FLOOD, a subject of the King of Great Britain, and resident of the city of Quebec and Province of Quebec, Dominion of Canada, have invented certain new and useful Improvements in Dirigible-Headlight Mechanism, of which the following is a full, clear, and exact description.
This invention relates to improvements in dirigible headlights for automobiles and the like, and the object of the invention is to provide means for automatically turning one of the headlights of a vehicle in the direction in which the vehicle is turning while leaving the other lamp directed straight ahead.

A further object is to provide means for turning the headlight on the inner side of the curved path to be followed by the vehicle and for turning the headlight through a slightly greater angle than the wheels of the vehicle, so that the path about to be traversed by the wheels on the inner side of the curve may be fully and completly illuminated.

A still further object is to provide an automatic light directing means which may be unaffected by small movements of the steering wheel or running wheels in avoiding ruts, puddles or local elevations in a bad road.

Another object is to provide apparatus of simple, durable and inexpensive construction which will be efficient in operation and which will not be unsightly or cumbersome.

The invention resides briefly in providing for each lamp a rotatable support to which is connected an operating lever having a substantially V-shaped slot at its free end, in which slot one end of a link is operatively engaged. The operating levers are so arranged that one arm of each V slot is outwardly directed and provides a lost motion connection between the link and levers operative to shift one lever during movement in one direction and the other lever during movement in the other direction. Force applying mechanism is connected in any suitable manner to the link.
In the drawings which illustrate the invention;—

Figures 1, 2 and 3 are diagrams illustrating the operation of the device with reference to a vehicle.

Fig. 4 is a plan view of the mechanism in detail.

Fig. 5 is a side elevation of the mechanism.

Fig. 6 is an elevation showing a detail of the construction and assembly of the members.

Fig. 7 is a plan view illustrating a slight modification to provide for independent movement of wheels and headlights.

Referring more particularly to the drawings, 11 designates the body of a vehicle, such as an automobile, having angularly movable front wheels 12 controlled by a steering gear 13 in the well known manner. The vehicle is provided with headlights 14 which are pivotally connected to the vehicle, so that they may be oscillated to throw a beam of light either straight ahead of the vehicle or at any desired angle to the longitudinal axis of the vehicle. These headlight supports are connected and operated by a mechanism hereinafter described and receive power to operate them through a rod 15 connected preferably to the steering gear.

The lamps 14 are each mounted on the vehicle by means of a rotatable support, indicated at 16, which support has rigidly connected thereto an arm 17, the arms being normally disposed in parallelism, as indicated in Figure 4. Toward the free extremity, each arm is provided with a longitudinally disposed slot or groove 18 having a laterally directed arcuate extension 19 at its forward end. The main portions of the slots 18 are in or parallel with the axial line of the levers, so that when the levers are assembled in parallelism on a vehicle, the body portions of the slots will be in parallelism. The levers are exactly alike but are arranged in assembly, so that the slot extensions extend both outwardly or both inwardly from the levers, the outward extension being illustrated. While the levers have been shown as of skeleton formation, it will be understood that the profile of the levers is immaterial, the arrangement of the slots with reference to the headlight supports 16 being the only important factor. As shown, the body portion of each slot is straight, while the laterally directed portions 19 are arcuate, being each circularly curved from a centre 20 located preferably in the axial line of the lever.

The levers on opposite sides of the vehicle are connected by a link or reach rod 21, bifurcated at its extremities to embrace the lever 17 and provided with pins 22 slidably engaging in the slots 18. The link 21 is preferably supported independently of the levers 17 by rockers 23, which are preferably mounted on spindles 24 located axially coincident with the centres 20, so that the swing of the rockers 23 will follow the curve of the slot extensions 19. The rockers 23 are preferably arranged in pairs, one rocker above and one below each lever 17, as clearly shown in Figures 5 and 6. Preferably also the bifurcations of the link 21 are spaced sufficiently far apart to embrace the rockers which are connected to the link by the pins 22. Stops 17ª may be provided to prevent movement of the levers 17 during travel of the pins 22 to the outer ends of the curved slot portions 19.

The rockers at one side of the vehicle are preferably connected rigidly to the spindle 24 and this spindle is rotatably mounted. An operating arm 25 is also rigidly connected to this spindle 24 and to the actuating rod 15, so that the power to operate the device is transmitted from the steering column. For the sake of uniformity of parts, it is preferred to have all rockers of uniform construction and both spindles 24 of uniform construction.

The apparatus may be conveniently attached to a vehicle by providing on the side sills brackets 26 carrying the bearings 27 and 28 for the spindles 24 and lamp supports 16. In the ordinary pleasure vehicle, these bearings will be concealed from view by the mud guard flashings and only the rockers, levers and link will be visible.

In Figure 7, a slightly alternative form is illustrated, in which the straight portion of the slot 18 is disposed out of and at an angle to the axis of the lever, with a view to having the pivot pin 22 normally located at a point intermediate the ends of the curved portion 19 of the slot instead of exactly at the junction of the curved and straight portions, as shown in Figure 4 for the reason hereafter given.

The device is so assembled on a car that when the front wheels are parallel, the levers 17 and rockers 23 are parallel and the lines of projection of the headlights are parallel with one another and with the wheels or the longitudinal axis of the vehicle, as shown in Figure 2. (In using the term "parallel" the necessary gather of the wheels is disregarded and also any convergence or divergence of the lines of light projection to comply with traffic regulations.) When the steering wheel is operated to turn the wheels as for movement to the left, as shown in Figure 1, the left hand headlight is turned simultaneously with the wheels but the right hand headlight remains unaffected. This result is accomplished by means of the slotted levers 17 in the following manner. Force is transmitted from the steering gear through the rod 15 to the arm 25 which rotates the spindle 24 to which it is attached, causing oscillation of the rockers 23 carried by the spindle. The link 21 pinned to the ends of these rockers and the similar rockers at the opposite side of the vehicle therefore transmits the oscillation of the rockers on one side to the rockers on the other side, so that the free ends of both rockers and the pins connecting the rockers and link move in the same direction in arcuate paths. The pins 22 which are normally located at the junction of the curved and straight slot portions, as shown in full lines, Figure 4, and as the curved portions project in opposite directions from the straight portions, it follows that the pin at one side of the vehicle being at the end of the curved portion of the slot will transmit motion to the lever 17, while the pin at the opposite side of the vehicle will merely travel through the curved portion of the slot without transmitting any motion to the lever. In this way, one lamp support 16 will be rotated while the other will remain unaffected. During the movement of the lever 17 and the adjacent rockers, the pin connecting them travels rearwardly in the straight portion of the lever slot to compensate for the compound arcuate movement of the members. When the wheels are returned to normal position, the reverse action occurs, the lever at one side of the vehicle being swung back to normal position and the pin advancing therein to the forward end of the straight slot portion while, at the other end of the link, the pin slides back through the arcuate slot without moving the lever. When the running wheels are turned in the opposite direction, the action is similar except that the previously unaffected headlight is turned while the previously turned light remains unaffected. By judicious proportioning of the leverages, as applied between the steering gear and headlights and between the steering gear and wheels, the headlights may be made to turn through greater, equal or lesser angles than the wheels but it is preferred to so proportion the levers operating the headlights relatively to the levers operating the wheels that the headlights will turn through slightly greater angles than the wheels, with the result that the swinging light will, so to speak, search around a curve and will throw a beam of light to disclose objects toward which the vehicle is inclining, so that the inclination may be regulated and the turning movement may be checked before the wheels are turned sufficiently to direct the vehicle toward an obstruction such as a post, fence, ditch or the like. During the swinging of one light, the other remains fixed relatively to the vehicle carrying it and so continues to illuminate the path from which the vehicle is turning.

In the form shown in Figure 7, the rockers have maximum oscillation on one side of the line of the lever 17 without moving the levers and a limited oscillation on the opposite side of the lever line without moving the levers in place of none at all, as in the form shown in Figure 4. This enables the wheels to be turned slightly from side to side to avoid small obstructions in the road without producing oscillation of the beams of light. This arrangement also has the advantage that it will prevent the headlights on the inner or passing side from being flashed directly on an approaching car when a sharp turn back to the original direction is made. It will be understood that the angle of permissible movement, as illustrated in Figure 7, is somewhat exaggerated for the purposes of illustration. By providing a curved connection between the arcuate and the straight portions of the slots, as shown in Figure 7, the turning headlight will be turned gradually instead of rather suddenly, as will occur when the two portions of the slots connect at a well defined corner, as shown in Figure 4. This gradual merging of the slot portions into one another will avoid any tendency to sudden flashing of the light beam from straight ahead to a point considerably to one side, as is the tendency when the direction of the slot changes abruptly.

While the device has been illustrated with the arcuate slot portions turned outwardly, it will be understood that the same result exactly may be obtained if both are turned inwardy, also the lever 25.

It will therefore be seen that the essential feature is really the provision of a pair of levers having slots extending, generally speaking, laterally thereof and a connection between corresponding ends of said slots. The form of invention illustrated may be said to be a refined embodiment of the broad principle, the rockers serving to support the link and actuating mechanism entirely independently of the levers, so that small vibrations will not be transmitted to the headlights. The arcuate formation of the lateral slot portions from the centres of oscillation of the rockers ensures against any drag which would be incident to the use of simple straight slots, and the straight slot portions 18 which are necessary on account of the compound lever movement serve also as positive means for returning the headlights to normal and avoid the use of supplementary mechanism for this purpose, as would be necessary if only lateral slots were used. Whether the lateral slot portions extend outwardly or inwardly from the levers, it is necessary to establish a connection between corresponding ends of the slots, i. e., between the two outer ends or between the two inner ends, and the term "corresponding" must therefore be regarded as having this significance.

Having thus described my invention, what I claim is;—

1. A dirigible headlight mechanism, comprising a pair of rotatable headlight supports, laterally slotted operating levers connected thereto, a connection between said levers engaging normally in corresponding ends of the lever slots and movable in said slots in coacting relation therewith to turn one of the headlights without affecting the other, rockers supporting the connection and an actuating member associated with said connection to move said connection in either of two directions dependent upon which headlight is to be turned.

2. A dirigible headlight mechanism comprising a pair of rotatable headlight supports, laterally slotted operating levers connected thereto, a connecting member extending between said levers, rockers supporting the connecting member and pins connecting the rockers and said member and disposed in the lever slots in engagement with corresponding ends of the same to connect the said member and levers, said pins being movable in the slots upon actuation of the connecting member to turn one of said supports without affecting the other.

3. A dirigible headlight mechanism comprising a pair of rotatable lamp supports, laterally slotted operating levers connected thereto, the laterally directed slots in the levers being arcuate and provided at corresponding ends with normally parallel straight portions, a connecting member extending between said levers engaging normally in corresponding ends of the lever slots, supporting rockers for the connecting member pivotally mounted at points concentric with the curvature of the arcuate slot portions, and an actuating member associated with said connecting member to rotate said supports singly and independently.

4. A dirigible headlight mechanism comprising rotatable headlight supports, operating levers connected thereto having oppositely extending arcuate slots therein and having normally parallel straight slot portions communicating with the arcuate slots at adjacent ends thereof, a link extending between the levers, pins carried by said link normally engaging in adjacent ends of the arcuate slot portions, rockers carrying said link connected thereto by said pins, and means for oscillating one of said rockers.

5. Dirigible headlight mechanism comprising rotatable headlight supports, lost motion operating means for each of said supports comprising a slotted lever connected to each of said headlight supports, a pair of rockers pivotally mounted adjacent each of said levers and embracing between them the lever, and a connecting link between said levers and supported by said rockers and bifurcated at each end to embrace the rockers and levers therebetween, and pins passing through the bifurcations of said connection, the rockers, and the slots of the levers and freely slidable in the lever slots.

6. A dirigible headlight mechanism comprising a pair of rotatable lamp supports, operating levers fixed thereto, each of said levers being formed with intersecting longitudinally and laterally directed slots communicating at the point of intersection, a link carrying pins disposed in the slotted portions of the levers, and means for actuating said links to turn one of the supports without affecting the other.

7. A dirigible headlight mechanism comprising a pair of rotatable lamp supports, operating levers fixed thereto, a connecting member extending between said levers and provided at its ends with pins disposed in corresponding ends of laterally directed slots formed in the said levers, said pins being movable, upon actuation of the turning member, to turn one support without affecting the other, and rockers supporting the links and connected thereto by means of said pins.

8. A dirigible headlight mechanism, comprising a pair of rotatable lamp supports, laterally slotted operating levers fixed thereto, a connecting link, a lost motion connection between the operating levers and the ends of the links including pins carried by the link and disposed in corresponding ends of the slots formed in the levers, rockers supporting said links and an actuating means for the link connected to one of said rockers.

In witness whereof, I have hereunto set my hand.

JOHN GARNAR FLOOD.